June 2, 1964 — B. J. BARISH — 3,135,059
WRITING SLATE DEVICE
Filed May 4, 1962
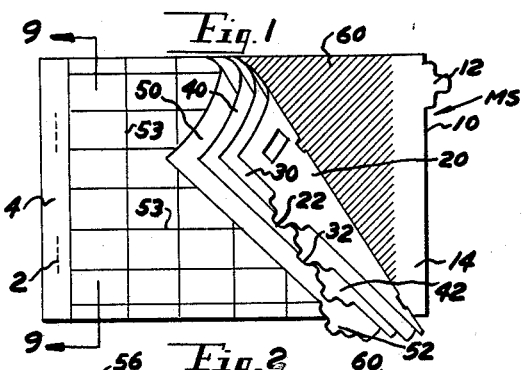
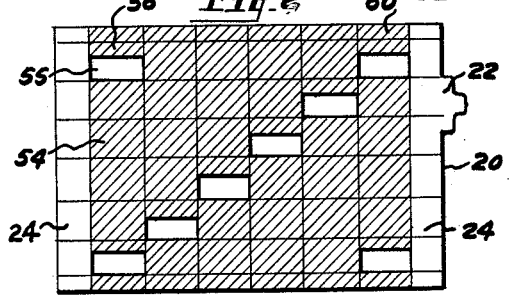
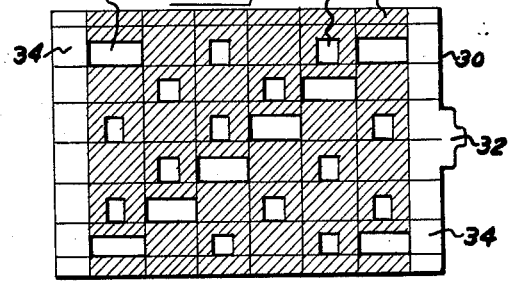
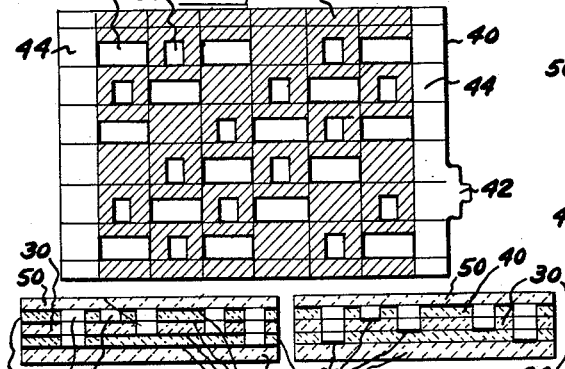
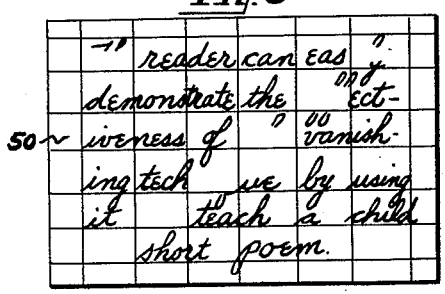
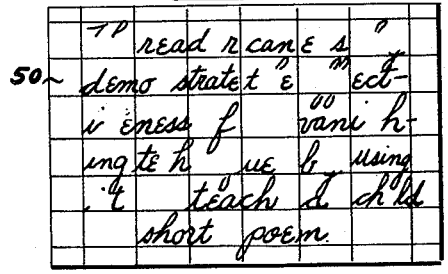
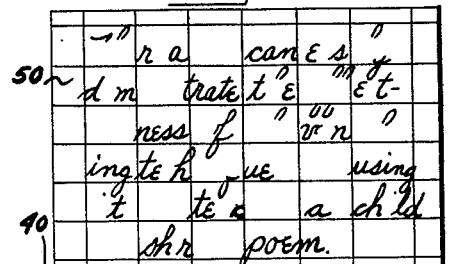
INVENTOR.
Benjamin J. Barish

United States Patent Office 3,135,059
Patented June 2, 1964

3,135,059
WRITING SLATE DEVICE
Benjamin J. Barish, Detroit, Mich.
(P.O. Box 1169, Tel-Aviv, Israel)
Filed May 4, 1962, Ser. No. 192,554
10 Claims. (Cl. 35—66)

My invention relates to writing slate devices, and particularly to those called self-erasing devices which permit the writing to be easily erased. It is herein described as embodied in devices particularly useful as an aid in learning or memorizing information in accordance with the so-called "vanishing technique."

The vanishing technique of memorizing can be briefly illustrated by the following quotation from an article entitled "Teaching Machines" by B. F. Skinner, appearing in Scientific American, November 1961, at page 100:

The reader can easily demonstrate the effectiveness of the vanishing technique by using it to teach a child a short poem. Write a poem of 10 to 14 lines on a blackboard in clear block letters. Have the subject read it aloud without making any effort to memorize it. Now erase a few unimportant letters on each line. Again ask the subject to read the poem. Repeat the process, each time erasing a few more letters and then whole words and phrases, until the poem has vanished. Toward the end even the faint clues of erased letters will be useful, but finally even they should be removed. At each reading the subject makes no effort to memorize, though he may have to make some effort to recall. For a dozen lines of average difficulty, four or five readings should suffice to eliminate the text altogether.

Various devices may be used in teaching or memorizing according to the vanishing technique, such as a blackboard and eraser mentioned in the above article. Also, devices such as film projectors are useful since they can be pre-programmed to erase certain parts of the text to be memorized at each step of the procedure.

By my invention, however, I provide a very simple and inexpensive device on which a text can be written and which permits sequential, partial erasures of the text until the text is completely erased. In addition, my device enables the partial erasures to be pre-programmed, or preselected, at each step of the procedure. My device operates on the self-erasing slate effect.

A self-erasing slate is a device which includes at least two elements, a colored backing sheet and an overlying impression sheet. The impression sheet is sufficiently opaque or translucent so that it normally hides the color of the backing sheet. However, when one writes on the impression sheet, as by a stylus, the two sheets are of such nature that the impression sheet adheres to the backing sheet along the writing lines and becomes substantially transparent along the lines of adherence, allowing the color of the backing sheet to show through and thereby producing a write. To erase the write, all that is necessary is to separate the impression sheet from the colored backing sheet, as by lifting it manually or by moving a separating slide.

In a common form of magic slate, the colored backing sheet is formed by applying a coating of wax and coloring matter, e.g. black pigment, to the backing sheet. The wax provides a soft tacky layer for promoting the adherence of the impression sheet along the writing lines, which transparentizes the impression sheet and renders the black color visible. This effect may also be produced without the use of a waxy material, for example, by the use of a colored plastic sheet having a non-tacky glossy surface for the base sheet, and a second plastic sheet also having a non-tacky glossy surface for the impression sheet, the latter sheet being normally semi-opaque but being sufficiently flexible to be locally pressed into adhesive contact with the first sheet to show the color of the first sheet, as described for example in U.S. Patent No. 2,697,884. The above-described effect, however produced, is frequently referred to herein as the "self-erasing" effect.

An object of my invention is to provide a novel device which can be used as an aid in memorizing or learning according to the above-identified vanishing technique.

A further object of my invention is to provide a novel self-erasing device.

A further object of my invention is to provide a novel self-erasing device which permits partial erasures to be made in a quick and simple manner, and which further permits such erasures to be preselected.

A still further object of my invention is to provide a novel notebook assembly incorporating a self-erasing device or slate and blank sheets of paper adapted to receive written information to be memorized or learned by the use of the self-erasing slate.

According to a broad aspect of my invention, I provide a novel self-erasing device or slate which has a first colored backing sheet and a plurality of at least two intermediate colored backings sheets one overlying the other with each colored sheet having portions of its colored surfaces engageable with the impression sheet. Upon the application of a writing pressure on the impression sheet, a write appears from all the colored backing sheets. Each backing sheet may be independently separated from the impression sheet. As each is separated, a part of the write is erased from the impression sheet, until the last backing sheet is separated which completes the erasure of the write.

The present invention also contemplates a notebook assembly which includes the self-erasing slate device and a plurality of sheets of ordinary blank paper, to further aid in memorizing information, as will be more fully described.

The novel features that are considered characteristic of my invention are set forth with particularity in the appended claims. The invention itself, both as to its organization and method of operation, as well as additional objects and advantages thereof, will best be understood from the following description when read in connection with the accompanying drawings, in which:

FIGURE 1, by way of illustrating a preferred embodiment of my invention, is a self-erasing slate device constructed in accordance with the invention so as to have particular application as an aid in learning or memorizing information;

FIGURES 2–4 are top plan views, illustrating the structure of certain of the backing sheets used in the device of FIGURE 1, and particularly illustrating the arrangement of openings in the backing sheets to enable the partial erasures to be effected in accordance with a preselected procedure;

FIGURE 5 illustrates how a write would first appear on the impression sheet when written thereon as the first step in the memorization of information;

FIGURES 6–8 illustrate how the write is partially erased from the impression sheet as each backing sheet in the bottommost position is separated from the impression sheet, FIGURE 6 illustrating the write when the backing sheet of FIGURE 2 is in the bottommost position, FIGURE 7 illustrating the write when the backing sheet of FIGURE 3 is in the bottommost position, and FIGURE 8 illustrating the write when the backing sheet of FIGURE 4 is in the bottommost position;

FIGURE 9 is a sectional view along lines 9—9 of FIGURE 1;

FIGURE 10 is a view corresponding to that of FIGURE 9 but illustrating a variation in the structure;

FIGURE 11 is also a view corresponding to that of FIGURE 9 but illustrating a further variation in the structure; and FIGURE 12 is a side elevational view of a novel notebook and self-erasing slate assembly embodying my invention.

Referring to FIGURE 1 which illustrates the novel self-erasing slate device (generally designated MS) constructed in accordance with the invention, it is seen the device includes an assembly of a plurality of sheets stacked one on top of another and bound along one margin by any suitable means, such as staples 2 and binding tape 4 applied thereover. The assembly includes a plurality of colored backing sheets and an impression sheet which is normally non-transparent but which has the property of becoming transparent when pressed into contact with the impression sheet. In the device illustrated in FIGURE 1 there are a first backing sheet 10 and three intermediate backing sheets, numbered 20, 30 and 40. The impression sheet overlies the latter sheets and is numbered 50.

Backing sheets 20, 30 and 40 may be made of thin material, such as plastic or paper, but the first backing sheet 10 is preferably made of thicker material (see FIG. 9) such as cardboard or plastic to provide rigidity to the device and a sturdy table surface for applying the write to the impression sheet 50. Sheet 50 is preferably made from thin plastic sheet material.

Each of sheets 10, 20, 30, 40 and 50 is formed with a marginal tab 12, 22, 32, 42 and 52, respectively, which more conveniently permits each sheet to be individually manipulated and separated from the others.

In the embodiment of FIGS. 1–4, each of the backing sheets 10, 20, 30 and 40 is coated with a material which imparts a colored, tacky surface to the sheet. A suitable coating, generally designated as 60 on all the sheets, may comprise a waxy base and a black pigment, commonly used in making the backing sheets of conventional self-erasing slate devices. The colored tacky coating is illustrated in FIGS. 1–4 as occupying the entire, upwardly-facing surfaces of backing sheets 10, 20, 30 and 40 except a slight margin 14, 24, 34 and 44 on the right and left sides of the backing sheets. The left margins are not coated since the sheets are bound together at that side, and the right margins are not coated since the sheets are manipulated at that side for individually separating them from the impression sheet 50.

All the backing sheets 10, 20, 30 and 40 are so constructed and arranged that a portion of each sheet is engageable with the impression sheet 50 when a writing pressure is applied to the latter, and thus each backing sheet produces a partial write on the impression sheet by means of the self-erasing slate effect. All the partial writes appear as one complete continuous write when viewing the impression sheet. However, as each of the backing sheets is separated, beginning with the bottommost sheet 10, a portion of the write is erased, by the self-erasing slate effect, until the last backing sheet 40 is separated, which completes the total erasure of the write on the impression sheet 50.

To produce this effect, all the backing sheets except the bottommost one 10 are formed with an arrangement of openings which permits each of the backing sheets 10, 20, 30 and 40 to have a portion of its surface engageable with the impression sheet 50. The number, form and arrangement of openings in the backing sheets would depend upon how much, what form, and where it is desired to have a partial erasure from the impression sheet 50 when a backing sheet is separated therefrom. Also, the number of partial erasures it is desired to have before a complete erasure is effected determines the number of backing sheets there should be in the assembly.

In the embodiment illustrated in FIGS. 1–4, there would be three steps of partial erasures, the fourth step effecting a complete erasure. The impression sheet 50 is illustrated as being provided with horizontal and vertical scorings or lines 53 to divide the writing surface into substantially equal rectangular boxes or spaces (except for those in the top and bottom lines which are slightly larger), there being illustrated six lines of such boxes with six boxes to a line. The lining of impression sheet 50 provides convenient reference marks for writing thereon the information to be memorized, and also for subsequently memorizing the information as it is repeatedly read and selectively erased.

The bottommost backing sheet 10 is not provided with openings since openings are necessary only where there is an underlying sheet to be engageable with the impression sheet 50. All the backing sheets overlying sheet 10 (i.e. sheets 20, 30 and 40) have aligned openings to enable a portion of sheet 10 to be engageable with the impression sheet. Similarly, sheets 30 and 40 which overlie sheet 20 have further aligned openings to enable portions of sheet 20 to be engageable with impression sheet 50. And similarly, sheet 40 which overlies sheet 30 has further openings to enable portions of sheet 30 to be engageable with the impression sheet.

To provide the openings in the colored backing sheets 20, 30 and 40, as illustrated in FIGS. 2, 3 and 4, the spaces corresponding to the boxes formed by lines 53 on sheet 50 are taken as references. For convenience, lines 54 are drawn on these sheets in the drawings, but it will be understood it would not be expected that they would be applied to these sheets in the actual article. The openings occupy approximately the lower two thirds of these reference spaces, to leave a margin of approximately the top third intact so that the sheet will not be excessively weakened, particularly when it is formed with a large number of openings such as would be the case in the topmost 40 of the colored backing sheets. Moreover, these margins further facilitate memorization, as they permit whatever appears in the topmost third of the reference spaces to be retained from the erased words, these being comparable to the smudges left when a blackboard and eraser are used, and like in the latter, these vestiges of the writing are also finally erased.

Referring to FIGURE 2, a reference space is designated therein as 54, an opening occupying the whole space except the top third margin is designated as 55, and the remaining top third margin described above is designated as 56. In FIGURE 2, the openings 55 formed in the colored backing sheet 20 occupy a whole reference space 54, except of course margin 56, but in sheets 30 and 40 illustrated in FIGURES 3 and 4 there are openings which occupy only one third, the middle third, of a reference space. These latter openings are designated 57.

The pattern of openings in the colored backing sheets 20, 30 and 40 is as follows: In sheet 20, illustrated in FIGURE 2, there is an opening 55 occupying the first reference space 54 and every fifth one thereafter. In sheet 30 illustrated in FIGURE 3, there are the same openings corresponding to those in sheet 20, plus an opening 57 occupying the middle one third of the third reference space 54 and every fifth one thereafter, plus a further opening 57 occupying the middle one third of the fifth reference space and every fifth one thereafter. Sheet 40 illustrated in FIGURE 4 contains the same openings as sheet 30 except that the remaining two thirds of the third reference space and every fifth one thereafter, occupied by opening 57, are also removed, thus converting such openings 57 in those reference spaces to the larger openings 55.

FIGURES 5–8 illustrate how a write applied to impression sheet 50 would be partially erased as each of the colored backing sheets is separated. FIGURE 5 illustrates the impression sheet containing the complete statement to be memorized, which, incidentally, is the first sentence in the quotation appearing at the beginning of this specification. In FIGURE 5, portions of all the colored backing sheets 10, 20, 30 and 40 are engageable with the underside of the impression sheet 50, in view of the arrangement of openings 55 and 57 as discussed above, and therefore the complete written statement appears. This statement is written on the impression sheet by a stylus, for example, or by the means to be described with reference to FIGURE 12, the purpose of writing it being to memorize it according to the vanishing technique.

The bottommost colored backing sheet 10 is then separated from the impression sheet 50, leaving sheet 20 as the bottommost colored backing sheet in contact with the impression sheet. This causes the erasure of the portions of the write attributable to the contact of backing sheet 10 with impression sheet 50, namely those portions corresponding to the openings in sheet 20. It will be recalled that sheets 30 and 40 contain all the openings corresponding to those in sheet 20, plus more; and that sheet 40 contains all the openings corresponding to those in sheet 30, plus more. Thus, the write at this stage will be as illustrated in FIGURE 6 wherein the portions of the write occupying the reference spaces corresponding to the openings in sheet 20 (FIG. 2) are erased. The upper remnants of the erased matter, however, are still retained because of margins 56.

Next, colored backing sheet 20 is then separated, which leaves sheet 30 as the bottommost backing sheet. More of the write is thus erased—actually the information coextensive with the openings in sheet 30—and the remaining write appears as shown in FIGURE 7.

Next sheet 30 is separated, leaving sheet 40 as the bottommost one and the only one in contact with impression sheet 50. Further information is thus erased, and the write will appear as that illustrated in FIGURE 8.

Finally, sheet 40 is separated from impression sheet 50. This completes the erasure of all the information written on the impression sheet.

During use, the user writes the complete information on the self-erasing slate; reads it, preferably aloud, without making an effort to memorize it; separates the colored backing sheet 10 from contact with the impression sheet, which erases a few of the words; reads it again; separates backing sheet 20 to erase more; and repeats the process until sheet 40 is separated to complete the erasure of all the information. Each of the readings provides repetition and reinforcement as the increasing number of vanishing fragments are stored in the reader's memory. By the last reading, the user should have memorized all the information originally written on the device.

The self-erasing slate effect in the above-described embodiment is produced by completely coating the upper surface of all the backing sheets 10, 20, 30 and 40 with a pigmented tacky material 60 such that the impression sheet adheres to it and shows the color of the pigment wherever local pressure is applied. FIGURE 9 illustrates a cross-section through lines 9—9 of FIGURE 1 to show this construction.

A variation of this construction is shown in FIGURE 10 illustrating a comparable sectional view. In the FIGURE 10 variation, the pigmented tacky material 60 is applied, not over the complete upper surfaces of backing sheets 10, 20, 30 and 40, but rather only on those parts of the surfaces which are engageable with the lower surface of impression sheet 50. This means that the upper surface of the topmost backing sheet 40 would be coated, but in the underlying sheets 30, 20 and 10, only those areas which are in alignment with the openings 55 and 57 in backing sheet 40. This variation not only reduces the manufacturing cost, but also enables the backing sheets to be more readily separated from the impression sheet. One way of making the variation of FIGURE 10 is to completely coat the top backing sheet 40 and to apply only spot coatings on the underlying sheets according to the desired pattern. However, a preferable method of making the variation of FIGURE 10 is to first stack all the backing sheets 40, 30, 20 and 10 after they have been formed with the desired pattern of openings, and then to coat the stacked sheets with the pigmented tacky material in one pass. This will produce a coating on the complete upper surface of sheet 40, and only on those areas of the underlying sheets in alignment with the openings in sheet 40, all of which areas are those which are engageable with the lower surface of the impression sheet 50, as illustrated in FIGURE 10.

A further variation is shown in FIGURE 11. Here, backing sheets 10, 20, 30 and 40 are merely colored; they are not provided with a tacky or waxy coating for promoting the adherence of these sheets to the impression sheet. Instead, the lower surface of the impression sheet is provided with a clear tacky, or wax coating, designated 62. Backing sheet 10, 20, 30 and 40 are colored completely or only on their upper surfaces by a color coating. The arrangement is such that a self-erasing slate writing effect is produced wherever pressure is applied to impression sheet 50, the write resulting from sheet 50 adhering along the writing lines to underlying backing sheets 10, 20, 30 and 40 by means of tacky coating 62. This transparentizes the impression sheet along the writing lines, enabling the color of the backing sheets to be seen therethrough.

Any other variation for producing the self-erasing slate effect, as described in the early part of this specification, may be used.

FIGURE 12 illustrates a further embodiment of my invention, wherein the self-erasing slate device MS described above is incorporated in a notebook assembly including a plurality of sheets of blank paper 70 and a ring binder 72. In the previous described embodiments, the information desired to be learned or memorized would normally be written on the slate by a stylus or the like and would eventually be completely erased. In the embodiment of FIGURE 12, however, the lowermost paper sheet 70 would be turned over to overlie the impression sheet of the self-erasing slate before the information is written. The overlying paper sheet, shown as 70', would thus receive in pencil or ink the information to be memorized and could therefore be used as a reference should the user have difficulty in recalling a part of the material being memorized. After sheet 70' is used, it is removed and another sheet from the bottom of the stack of sheets 70 is turned up to overlie the top of the self-erasing slate.

It is common in self-erasing slates to provide, in addition to the normally non-transparent (i.e. translucent or semi-opaque) impression sheet, a harder transparent sheet overlying the impression sheet. The harder transparent sheet protects the impression sheet by receiving the writing pressure of the stylus or other implement, but the writing pressure is transmitted to the impression sheet which in turn is pressed against the colored backing sheet. It is to be understood that my invention could of course also utilize such a protective transparent sheet, particularly in the embodiments of FIGURES 1–11.

The size of the device, the number of colored backing sheets, the form and arrangement of openings, etc. could be varied as desired in particular applications. The color could also be different in the several backing sheets, for example in an application such as learning languages, arithmetic problems, etc., where it may be desired to have one form of information appear in one color and another form appear in a different color. Further, while my invention has been particularly described with reference to an aid for learning or memorizing, it will be appreciated that it could be used in other applications and embodiments, wherever it may be desired to provide a device which is partially or selectively erasable. Many other variations, modifications or applications of my invention, or features thereof, will be apparent coming within the spirit or scope of my invention, which is to be limited only as set forth in the following claims.

I claim:

1. A device of the character described comprising: a first backing sheet; a lower intermediate backing sheet overlying said first backing sheet; an upper intermediate backing sheet overlying said lower intermediate backing sheet; and an impression sheet overlying the upper intermediate backing sheet; said lower intermediate backing sheet being formed with at least one opening therein; said upper intermediate backing sheet being formed with at least one opening therein aligned with the opening of said lower intermediate backing sheet, and with at least one other opening non-aligned with said opening of said lower intermediate backing sheet, whereby surfaces of said first backing sheet and of said lower and upper intermediate backing sheets are exposed to said impression sheet; said exposed surfaces being colored; said impression sheet being sufficiently opaque to normally hide the color of said exposed colored surfaces but being rendered sufficiently transparent upon the application of local pressure to render the color of said exposed colored surfaces visible therethrough.

2. A device of the character described comprising: a first backing sheet; a plurality of at least two intermediate backing sheets stacked one on top of the other overlying said first backing sheet; and an impression sheet overlying the topmost backing sheet; said intermediate backing sheets being formed with openings therein; the openings in each intermediate backing sheet comprising first openings aligned with the openings in all the underlying intermediate backing sheets and second openings non-aligned with any openings in the underlying backing sheets, whereby surfaces of all said backing sheets are exposed to said impression sheet; said exposed surfaces being colored; said impression sheet being sufficiently opaque to normally hide the color of said exposed colored surfaces but being rendered sufficiently transparent upon the application of local pressure to render the color of said exposed colored surfaces visible therethrough.

3. A device of the character described comprising: a first backing sheet; a plurality of at least two intermediate backing sheets stacked one on top of the other overlying said first backing sheet; and an impression sheet overlying the topmost backing sheet; said intermediate backing sheets being formed with openings therein; the openings in each intermediate backing sheet comprising first openings aligned with the openings in all the underlying intermediate backing sheets and second openings non-aligned with any openings in the underlying backing sheets, whereby surfaces of all said backing sheets are exposed through said openings for engagement by said impression sheet; said exposed surfaces being colored; said impression sheet being sufficiently opaque to normally hide the color of said exposed colored surfaces but being adhereable to the engageable portions thereof upon the application of local pressure to become sufficiently transparent to render the color of said exposed colored surfaces visible therethrough along the lines of adherence, thereby producing a visible impression on said impression sheet; said backing sheets being independently separable from said impression sheet, starting with said first backing sheet, to make the overlying intermediate backing sheets successively the bottommost backing sheet, whereby that portion of the visible impression occupying the space of the openings in the bottommost backing sheet is erased with each separation of a backing sheet.

4. A device as defined in claim 3 wherein the color of all said backing sheets is the same, whereby the impression produced on said impression sheet will appear as one continuous write.

5. A device as defined in claim 3 wherein the upper surfaces of all said backing sheets are coated with a tacky material to promote the adherence of said impression sheet upon the application of local pressure.

6. A device as defined in claim 3 wherein only the surfaces of said backing sheets exposed through said openings for engagement by said impression sheet are coated with a tacky material to promote the adherence of said impression sheet upon the application of local pressure.

7. A device as defined in claim 3 wherein the lower surface of said impression sheet is coated with a tacky material to promote the adherence thereof to the exposed surfaces of said colored backing sheets upon the application of local pressure.

8. A device as defined in claim 3 wherein said impression sheet is divided into a plurality of substantially equal boxes, and wherein the openings in said colored backing sheets register with certain of said boxes.

9. A device as defined in claim 3 wherein said first backing sheet is of substantial thickness to provide a relatively sturdy table surface for writing on said impression sheet, and wherein said intermediate backing sheets are relatively thin.

10. A notebook assembly of the character described comprising: a device as defined in claim 3; a plurality of sheets of paper normally arranged in a stack underlying said device; and a binder holding said device and said plurality of sheets of paper and permitting the lowermost paper sheet to be turned to overlie the impression sheet of said device.

References Cited in the file of this patent

UNITED STATES PATENTS

| | | |
|---|---|---|
| 1,556,499 | Deutsch | Oct. 6, 1925 |
| 2,149,779 | Kroner | Mar. 7, 1939 |
| 2,323,521 | De Journette | July 6, 1943 |
| 2,596,890 | Dechert | May 13, 1952 |
| 3,019,034 | McBride | Jan. 30, 1962 |